(12) United States Patent
Baud et al.

(10) Patent No.: US 8,871,044 B2
(45) Date of Patent: Oct. 28, 2014

(54) PART BASED ON C/C COMPOSITE MATERIAL, AND A METHOD OF FABRICATING IT

(75) Inventors: Sandrine Baud, Lyons (FR); Pascale Jacquemard, Saint Pierre de Chandieu (FR); René Pailler, Cestas (FR); Magali Rollin, Verberie (FR); Michaël Podgorski, Cour-Cheverny (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 426 days.

(21) Appl. No.: 12/662,926

(22) Filed: May 12, 2010

(65) Prior Publication Data

US 2010/0291373 A1    Nov. 18, 2010

(30) Foreign Application Priority Data

May 13, 2009 (FR) ...................... 09 53155

(51) Int. Cl.
| | |
|---|---|
| *B05D 3/02* | (2006.01) |
| *C04B 35/83* | (2006.01) |
| *C04B 35/84* | (2006.01) |
| *F16D 69/02* | (2006.01) |

(52) U.S. Cl.
CPC ......... *C04B 35/83* (2013.01); *C04B 2235/3839* (2013.01); *C04B 2235/785* (2013.01); *C04B 2235/3244* (2013.01); *C04B 2235/441* (2013.01); *F16D 69/023* (2013.01)
USPC .................. 156/89.26; 156/89.11; 156/89.25; 156/307.3; 428/323; 428/325

(58) Field of Classification Search
None
See application file for complete search history.

(56) References Cited

U.S. PATENT DOCUMENTS

| | | | |
|---|---|---|---|
| 4,921,731 A * | 5/1990 | Clark et al. ................... | 427/314 |
| 5,389,152 A | 2/1995 | Thurston et al. .............. | 118/429 |
| 5,792,715 A | 8/1998 | Duval et al. ................... | 442/388 |
| 5,904,957 A | 5/1999 | Christin et al. ............ | 427/248.1 |
| 6,009,605 A | 1/2000 | Olry et al. ........................ | 28/107 |
| 6,363,593 B1 | 4/2002 | Duval et al. ..................... | 28/107 |
| 6,376,431 B1 | 4/2002 | Matsumoto et al. .......... | 508/107 |
| 7,419,700 B2 * | 9/2008 | Guther et al. ............... | 427/249.2 |
| 2005/0051394 A1 | 3/2005 | Huang et al. .............. | 188/251 A |
| 2005/0276961 A1* | 12/2005 | Sherwood et al. ......... | 428/292.1 |

FOREIGN PATENT DOCUMENTS

| | | |
|---|---|---|
| EP | 0 404 571 | 12/1990 |
| EP | 0 507 564 | 10/1992 |
| EP | 1 748 036 | 1/2007 |
| WO | WO 2006/067184 | 6/2006 |

OTHER PUBLICATIONS

International Search Report dated Nov. 23, 2009 as issued for French Patent Application No. 0953155.

\* cited by examiner

*Primary Examiner* — Monique Jackson

(74) *Attorney, Agent, or Firm* — Pillsbury Winthrop Shaw Pittman, LLP

(57) ABSTRACT

After making a carbon fiber preform and prior to completing densification of the preform with a carbon matrix, impregnation is performed with a liquid formed of a sol-gel type solution and/or a colloidal suspension enabling one or more zirconium compounds to be dispersed. The impregnation and the subsequent treatment, up to obtaining the final part, are performed in such a manner as to have, in the final part, grains or crystallites of one or more zirconium compounds presenting a fraction by weight lying in the range 1% to 10% and of composition having at least a majority of the $ZrO_xC_y$ type with $1 \leq x \leq 2$ and $0 \leq y \leq 1$.

13 Claims, 3 Drawing Sheets

PART BASED ON C/C COMPOSITE MATERIAL, AND A METHOD OF FABRICATING IT

CROSS REFERENCE TO RELATED APPLICATIONS

This application claims priority to French Patent Application No. 0953155, filed May 13, 2009, the contents of which are incorporated herein by reference in their entireties.

BACKGROUND OF THE INVENTION

The invention relates to parts based on carbon/carbon (C/C) composite material, in particular friction parts such as airplane brake disks. Nevertheless, the invention is not limited to this application and it also applies to other types of C/C composite material parts, in particular those for which improved mechanical properties are desired.

Airplane brake disks made of C/C composite material are in widespread use. The fabrication of such disks conventionally includes a step of making a fiber preform out of carbon fibers in a shape that is close to the shape of the disk that is to be fabricated, the preform serving to constitute the fiber reinforcement of the composite material, and then densifying the preform with a carbon matrix.

One well-known method of making a fiber preform out of carbon fibers comprises superposing fiber plies of carbon-precursor fibers, e.g. of pre-oxidized polyacrylonitrile (PAN), bonding the plies together, e.g. by needling, and performing carbonization heat treatment to transform the precursor into carbon. Reference may be made to document U.S. Pat. No. 5,792,715, amongst others.

The preform may be densified with a carbon matrix by performing chemical vapor infiltration (CVI). Preforms are placed in an enclosure into which a gas is admitted that contains one or more precursors of carbon, e.g. methane and/or propane. The temperature and pressure in the enclosure are controlled so as to enable the gas to diffuse within the preforms and form therein a solid deposit of pyrolytic carbon (PyC) by the precursor(s) decomposing. A method of densifying a plurality of annular preforms for brake disks placed in stacks is described in document U.S. Pat. No. 5,904,957, amongst others.

Densification with a carbon matrix may also be performed using a liquid technique, i.e. by impregnating the preform with a carbon precursor, typically a resin, and then pyrolyzing the precursor, it being usual to perform a plurality of impregnation and pyrolysis cycles.

A densification method is also known that may be said to rely on "calefaction" and in which a disk preform for densifying is immersed in a bath of carbon precursor, e.g. toluene, and is heated, e.g. by inductive coupling, so that the precursor vaporises in contact with the preform and diffuses within it so as to form a PyC deposit by decomposition. Such a method is described in document U.S. Pat. No. 5,389,152, amongst others.

Amongst the various properties looked for in brake disks based on C/C composite material, low wear is highly desirable.

In order to improve wear resistance, many proposals have been made to introduce ceramic grains in the C/C composite material.

Thus, document U.S. Pat. No. 6,376,431 describes impregnating a carbon fiber preform with a sol-gel type solution containing a precursor for silica ($SiO_2$) that, after heat treatment and reacting chemically with the carbon, leaves grains of silicon carbide (SiC) distributed within the preform, which grains represent no more than 1% by weight of the final C/C composite material.

Document WO 2006/067184 recommends impregnating a fiber texture of plies used for making the preform with a sol-gel type solution or a colloidal suspension so as to obtain a dispersion of grains of oxides such as the oxides of titanium ($TiO_2$), of zirconium ($ZrO_2$), of hafnium ($HfO_2$), and of silicon ($SiO_2$). Subsequent heat treatment transforms those oxide grains into carbide grains.

Document EP 1 748 036 describes impregnating a carbon fiber substrate with a slip containing a carbon-precursor resin and grains of metallic oxide, e.g. $SiO_2$, $TiO_2$, $ZrO_2$, . . . . After heat treatment, a C/C composite material is obtained containing carbide grains obtained by transforming oxide particles. The examples indicate the use of oxide grains having a size of several micrometers.

Document EP 0 507 564 describes making a C/C composite material part by mixing carbon fibers, ceramic powder, and carbon powder, molding, and sintering, the ceramic powder being for example an oxide such as $SiO_2$, $TiO_2$, $ZrO_2$, . . . , or a nitride. The use of $ZrO_2$ powder made of micrometer-sized grains is mentioned in Example 2, with the quantity of $ZrO_2$ in the final composite material being 6.2%. It should be observed that amongst the ceramic powders envisaged, $ZrO_2$ is far from giving the best wear results.

Document EP 0 404 571 describes a method similar to that of EP 0 507 564, but for forming a sliding part having a low coefficient of friction.

OBJECT AND SUMMARY OF THE INVENTION

The present invention seeks to propose a method enabling a part based on C/C composite material to be obtained that has improved properties, incorporating ceramic grains, and in particular a friction part presenting low wear and a coefficient of friction that is suitable for application to braking, and that is stable, in particular when performing high-energy braking.

This object is achieved by a method of the type comprising making a preform of carbon fibers, densifying the preform with a carbon matrix, and during the fabrication process, introducing grains or particles of ceramic dispersed within the part, in which method, prior to completing densification, impregnation is performed using a liquid formed of a sol-gel type solution and/or a colloidal suspension enabling one or more zirconium compounds to be dispersed, and the impregnation and the subsequent treatments, until the final part is obtained, are performed in such a manner as to have, in the final part, grains or crystallites of one or more zirconium compounds representing a percentage by weight lying in the range 1% to 10% and of composition having at least a majority of the $ZrO_xC_y$ type with $1 \leq x \leq 2$ and $0 \leq y \leq 1$.

The term "a majority" is used herein to mean that the $ZrO_xC_y$ phases represent more than 50% by weight and preferably more than 90% by weight of the ceramic grains or crystallites dispersed within the part. Compounds of the Zr—O—C system other than compounds of the $ZrO_xC_y$ type as defined above and compounds of systems containing Zr, O, C, and one or more other elements, e.g. nitrogen, N, may also be present, but in a minority quantity.

As explained in the detailed description, this method is remarkable in that it enables a very considerable reduction in overall wear of a friction part in comparison with a friction part made of conventional C/C composite material that does not incorporate ceramic grains, with this applying in particular during the low-energy braking operations that lead to a major fraction of the wear in airplane brake disks based on C/C composite material.

As likewise shown in the detailed description, the method is also remarkable in that it enables very good mechanical properties to be obtained, which presents a particular advantage for parts based on C/C composite material, regardless of their purpose.

In one implementation, impregnation is performed using a sol-gel type solution containing one or more precursors of zirconia $ZrO_2$.

Impregnation is advantageously performed so that, in the final part, there are nanometric crystallites with a mean size of less than 200 nanometers, e.g. a few nanometers to a few tens of nanometers, which crystallites form clumps or grains with a size of several micrometers that are distributed throughout the volume of the part.

An organic zirconium compound may be used as a precursor for $ZrO_xC_y$, e.g. zirconium butoxyde which is a precursor for zirconia.

The sol-gel type solution may also include one or more carbon precursor compounds, in particular saccharose.

After impregnation, heat treatment is performed to decompose the precursor(s) and to stabilize the zirconium compound(s) in a crystallized form. The heat treatment may be performed at a temperature lying in the range 600° C. to 1700° C., preferably in the range 900° C. to 1550° C. The duration of the heat treatment may lie in the range 1 hour (h) to several tens of hours, preferably in the range 2 h to 5 h, with it being possible to select a relatively short duration in particular when the impregnation and the heat treatment are followed by a CVI densification process at a temperature that is usually around 1000° C., it being possible for the heat treatment and the densification by CVI to follow one after the other in the same oven.

During the heat treatment, compounds forming part of the Zr—O—C system may be formed either from a precursor contained in the sol-gel type solution, or by reaction between a zirconium compound, e.g. zirconia, coming from a precursor, and carbon. The carbon may be the carbon of the fibers, or of a matrix phase that is already present, or indeed it may be carbon from a component of the sol-gel type solution, in particular carbon derived from saccharose. The overall heat treatment, including possible exposure to high temperature during a CVI process, is controlled so as to end up obtaining one or more zirconium compounds of the type having at least a majority of $ZrO_xC_y$, such that $1 \leq x \leq 2$ and $0 \leq y \leq 1$.

In another embodiment, impregnation is performed by a colloidal suspension containing particles of one or more zirconium compounds, e.g. a colloidal suspension of zirconia.

Heat treatment may then optionally be performed, where necessary, to stabilize the zirconium compound(s) in crystallized form, as is well known for zirconia.

During the heat treatment, limited chemical interaction may possibly occur with the carbon of the fibers or of a matrix phase that is already present. The optional heat treatment is preferably limited to obtaining stabilization, and is in any event controlled so as to end up obtaining one or more zirconium compounds of the type having a majority of $ZrO_xC_y$ with $1 \leq x \leq 2$ and $0 \leq y \leq 1$.

In an implementation, impregnation is performed prior to densification, on the fiber preform or on a fiber texture used to form the plies that are superposed and bonded together to constitute the fiber preform. After heat treatment, if any, the fibers are completely or partially covered in grains made of zirconium compound(s), thereby also contributing to filling in the pores in the preform, at least in part, when impregnation is performed at the preform stage.

In another implementation, impregnation is performed between two densification cycles, when densification is performed in a plurality of consecutive cycles, the grains of the zirconium compound(s) completely or partially covering the carbon matrix phase that partially densifies the part and filling the residual pores in part.

In another aspect, the invention also provides a part, in particular a friction part, based on C/C composite material and including ceramic grains dispersed within the material, the grains representing 1% to 10% by weight and being formed of one or more zirconium compounds of the type having at least a majority of $ZrO_xC_y$ with $1 \leq x \leq 2$ and $0 \leq y \leq 1$.

The zirconium compound(s) may be in the form of nanometric crystallites having a mean size of less than 200 nanometers, e.g. a few nanometers to a few tens of nanometers, forming clumps or grains having a size of several micrometers that are distributed throughout the volume of the part.

BRIEF DESCRIPTION OF THE DRAWINGS

Implementations are described in detail below. Reference is made to the accompanying drawings, in which.

DETAILED DESCRIPTION OF IMPLEMENTATIONS

In the description below, particular attention is given to making disks based on C/C composite material for airplane brakes. Nevertheless, the invention is applicable to making other friction parts based on C/C composite material, such as brake disks for land vehicles, in particular cars, and friction parts other than disks, in particular skids. More generally, the invention is applicable to making parts which are based on C/C composite material and which are not necessarily intended to be used as friction parts.

Figure 1:
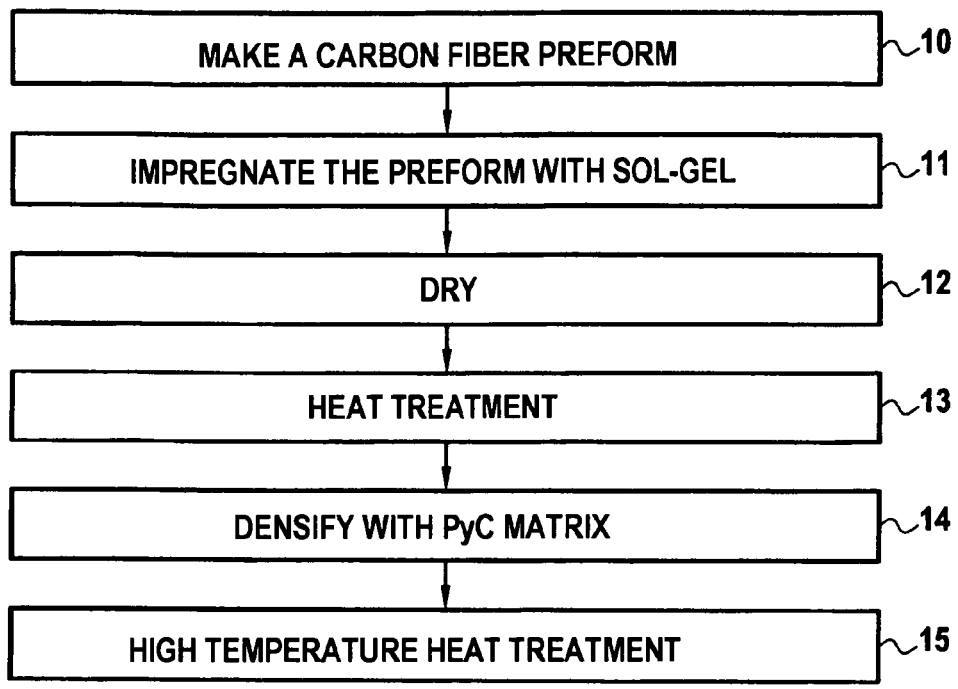
FIG. 1 shows the successive steps of a particular implementation of a method of the invention.

A first implementation of a method of the invention is shown in FIG. 1.

A first step 10 consists in using a carbon fiber preform for a brake disk. Such a preform may be made, for example, by superposing plies cut out from a fiber texture made of carbon-precursor fibers, bonding the plies together by needling, and transforming the carbon precursor by heat treatment. In a variant, it is also possible to make an annular preform by winding a helical fabric of carbon-precursor fibers in superposed turns, bonding the turns to one another by needling, and transforming the precursor by heat treatment. By way of example, reference made by made to the following documents: U.S. Pat. No. 5,792,715; U.S. Pat. No. 6,009,605; and U.S. Pat. No. 6,363,593. It is also possible to make preforms directly from plies of fiber texture made of carbon fibers, which plies are superposed and bonded together, e.g. by needling.

In step 11, the preform is impregnated with a liquid made up of a sol-gel type solution comprising one or more precursors enabling grains or crystallites of one or more zirconium compounds to be formed and dispersed within the preform, at least a majority of the compounds forming part of the Zr—O—C system.

At least one precursor may be in the form of a zirconium alkoxyde compound, such as zirconium butoxyde which is a precursor of zirconia $ZrO_2$. Other zirconia precursors may be used such as zirconium propoxyde, zirconium tetrachloride, or zirconium nitrate. The sol-gel type solution may also include a carbon precursor, e.g. saccharose. Other carbon precursors may be used such as methylcellulose, fructose, or glucose.

By way of example, a suitable sol-gel type solution is obtained by mixing a first solution comprising zirconium butoxyde with butanol and acetyl acetone, with a second solution comprising saccharose dissolved in an acid, e.g. hydrochloric acid with added ethanol. Naturally, other solvents could be used for the zirconium butoxyde and the saccharose providing they enable a sol-gel type solution to be obtained that is capable of impregnating the fiber preform in substantially uniform manner. Other known precursors for forming a zirconia precursor sol-gel type solution may naturally be used, in particular without requiring the presence of saccharose or some other similar precursor of carbon.

In step 12, stove drying is performed to eliminate the solvents, e.g. at a temperature lying in the range 60° C. to 100° C. for a period of about ten to several tens of hours.

In step 13, heat treatment is performed to transform the precursor(s) by decomposition and to stabilize the resulting zirconium compound(s) in crystallized form so as to obtain, in this form, one or more zirconium compounds being at least in majority of the $ZrO_xC_y$ type where $1 \leq x \leq 2$ and $0 \leq y \leq 1$. When the sol-gel type solution includes a carbon precursor, e.g. saccharose, the heat treatment transforms the carbon precursor which remains present in the preform.

The heat treatment is performed under an inert atmosphere, e.g. under argon or nitrogen. It is performed at a temperature lying in the range 600° C. to 1700° C., preferably in the range 900° C. to 1550° C., for a duration lying in the range 1 h to several tens of hours, preferably in the range 2 h to 5 h. During heat treatment, chemical interaction may occur between one or more zirconium compounds from one or more precursors contained in the sol-gel type solution and the carbon likewise coming from one or more components of the sol-gel type solution or from fibers of the preform, giving rise to compounds forming part of the Zr—O—C system. The heat treatment is controlled in terms of temperature and duration, as specified, in order to ensure the presence of at least a majority of $ZrO_xC_y$ compounds as defined above. It should be observed that for the duration of the heat treatment, account may be taken of subsequent exposure to high temperature, as occurs when the densification of the preform with a carbon matrix is performed by a CVI process, since such a process is usually undertaken at a temperature of about 1000° C. Besides the above-mentioned majority $ZrO_xC_y$ compounds, there may also be a minority of other compounds of the Zr—O—C system and possibly of other compounds of systems derived from the Zr—O—C system and having one or more other elements such as nitrogen N (in particular if a nitrogen atmosphere is used during the heat treatment).

Nanometric crystallites are thus obtained with at least a majority of the crystallites being of the above defined $ZrO_xC_y$ type, said crystallites presenting a mean dimension of less than 200 nanometers, e.g. a few nanometers to a few tens of nanometers, and capable of forming grains or clumps having a size of several micrometers that are distributed within the volume of the preform.

In step 14, densification with a PyC matrix is performed, e.g. using a CVI process based on a gaseous phase containing methane and/or propane, for example. CVI densification is performed in an enclosure at a temperature of about 1000° C. and under a pressure that is preferably less than 5 kilopascals (kPa), as is well known in itself. The heat treatment step 13 and the CVI densification step 14 may follow one from the other in the same oven, with the preforms being left in the oven at the end of the heat treatment and with the conditions that exist in the oven at the end of the heat treatment (atmosphere in the oven, pressure, and temperature) being modified to correspond to those required for CVI densification.

In a variant, carbon matrix densification may be performed by a method using a liquid technique or a calefaction technique as mentioned above.

In step 15, it is possible to perform heat treatment at high temperature, greater than 1400° C., as is well known. Such heat treatment is performed under an inert atmosphere or a vacuum.

This produces a disk made of C/C composite material enriched with zirconium compound crystallites of which at least a majority is of the above-mentioned $ZrO_xC_y$ type, i.e. at least a majority are of zirconia or of oxygen-rich zirconium oxycarbide of composition lying in the range $ZrO_2$ to ZrOC. Impregnation with a sol-gel type solution makes it possible to obtain nanometric crystallites of mean size smaller than 200 nanometers, e.g. a few nanometers to a few tens of nanometers possibly forming clumps or grains with a size of several micrometers distributed throughout the volume of the disk. Impregnation is performed in such a manner that the mass fraction represented by said crystallites, possibly clumped into grains, in the disk based on C/C composite material as finally obtained, lies in the range 1% to 10%.

As explained below, the presence of crystallites, possibly clumped into grains, and presenting at least a majority of the above-specified $ZrO_xC_y$ type, gives rise to a very significant decrease in wear, when compared with a C/C composite material that is not enriched with ceramic particles.

Figure 2:
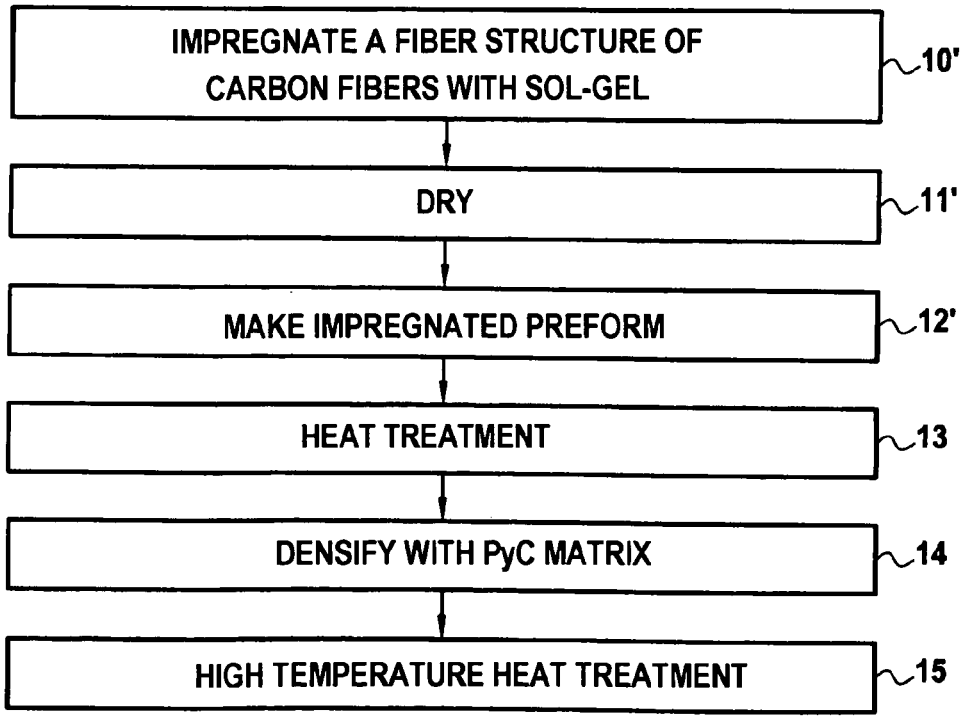
FIGS. 2 to 4 show the successive steps of other particular implementations of a method of the invention.

A variant implementation of the above method is shown in FIG. 2.

This variant differs from the method of FIG. 1 in that the impregnation with the sol-gel type composition is performed on a fiber texture made of carbon fibers (step 10'). After drying (step 11'), the impregnated texture is used for obtaining plies that are superposed and bonded together, e.g. by needling, in order to obtain a preform of impregnated carbon fibers (step 12'). The following steps 13 to 15 are unchanged.

Figure 3:
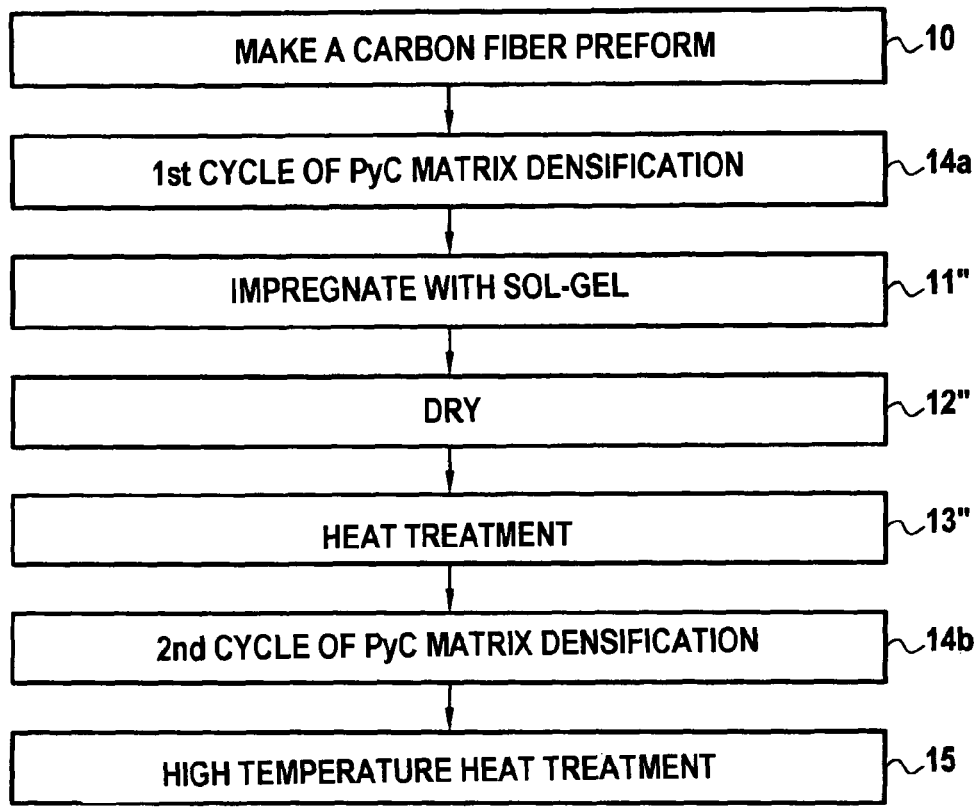

Another variant implementation of the method is shown in FIG. 3.

This variant differs from the method of FIG. 1 in that the densification with the PyC matrix is performed in two cycles 14a and 14b. The impregnation steps 11" with a sol-gel type solution, the drying step 12", and the heat treatment step 13", similar to the steps 11, 12, and 13 of the FIG. 1 method, are performed between the the two cycles 14a and 14b. Two-cycle densification is known. After a first densification cycle, a scalping operation may be performed in order to open the pores in the surfaces of partially-densified preforms. Scalping is then performed prior to impregnating with the sol-gel type composition.

Figure 4:
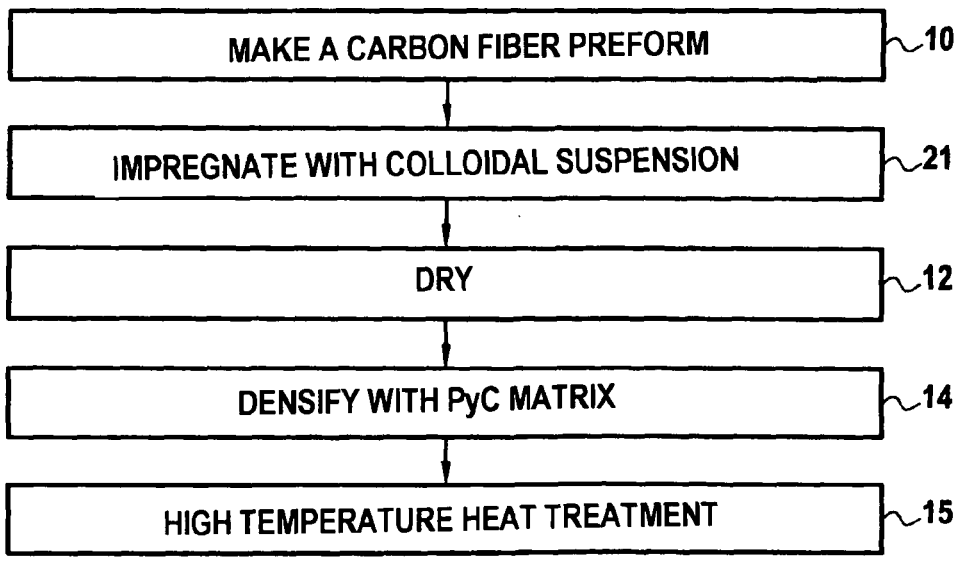

The method of FIG. 4 differs from that of FIG. 1 in that, after step 10, the impregnation in step 21 is performed using a colloidal suspension and not a sol-gel type solution, and in that the step of heat treatment after impregnation can be omitted. After impregnation, the method continues with the drying step 12, the densification step 14, and the final heat treatment step 15, as in the method of FIG. 1.

A colloidal suspension is used that contains particles of one or more zirconium compounds of the type comprising a majority of $ZrO_xC_y$ with $1 \leq x \leq 2$ and $0 \leq y \leq 1$, these particles presenting a mean size of less than 200 nanometers. Such a colloidal suspension may be obtained optionally by causing a zirconium powder to react with carbon and by putting the resulting powder into suspension. It is also possible to use a colloidal suspension of zirconia as known in the art and commercially available.

The variant of FIG. 4 (using a colloidal suspension instead of a sol-gel type solution) may also be applied to the methods of FIGS. 2 and 3.

It should be observed that if it is desirable to perform stabilization heat treatment of the zirconium compound(s) contained in the colloidal suspension, that is performed while retaining an above-mentioned majority fraction of compounds of the $ZrO_xC_y$ type with $1 \leq x \leq 2$ and $0 \leq y \leq 1$, in spite of possible chemical interaction with the carbon of the fibers or of a matrix phase (if impregnation is performed between two densification cycles).

Naturally, impregnation may be performed several times over at different stages (fiber texture, preform, and/or between two densification cycles).

It should also be observed that impregnation may be performed using a sol-gel type solution and a colloidal suspension, either simultaneously, or else respectively at different stages in the fabrication of the parts.

Example 1

Comparative

Airplane brake disks of C/C composite material were fabricated as follows.

Fiber preforms were made by superposing and needling plies of a fiber texture made of fibers of pre-oxidized PAN, a precursor of carbon, as described in U.S. Pat. No. 5,792,715. The fiber texture was in the form of a multi-axial sheet obtained by superposing and lightly needling three unidirectional sheets extending in directions forming angles of 60° between one another. After carbonizing the precursor, carbon fiber preforms were obtained with a fiber volume ratio of about 25% (percentage of the apparent volume of the preform occupied by the fibers).

Each preform was then densified with a PyC matrix obtained by CVI, with the final relative density of the composite material being greater than or equal to 1.75. Heat treatment at high temperature, greater than 1400° C., was performed in the final stage.

Example 2

Carbon fiber preforms were obtained as in Example 1. Each preform was then impregnated in a sol-gel type solution based on a precursor of zirconia prepared in the following manner, the table below giving the constituents of the solution and their proportions by weight.

| Constituents | % by weight |
|---|---|
| Zirconium butoxyde | 31.23 |
| Butanol | 17.85 |
| Acetyl acetone | 8.03 |
| Hydrochloric acid solution (pH = 1.6) | 21.41 |
| Saccharose | 10.77 |
| Ethanol | 10.71 |

The butanol and the zirconium butoxyde were initially mixed together. The acetyl acetone was then added. The solution was maintained under stirring. Simultaneously, the saccharose was dissolved under stirring in water that had previously been acidified by adding hydrochloric acid to obtain a pH of 1.6, and the ethanol was poured into said solution. This mixture was then added drop by drop to the first solution of butanol, zirconium butoxyde, and acetyl acetone.

In a container, the sol-gel solution prepared as specified above was poured onto the preform for impregnation. The system was closed with a plastics film and placed under a suction hood for 6 h so as to ensure optimum wetting. Thereafter the preform was dried at 70° C. for 24 h in order to evaporate the solvents.

The preforms were impregnated with the sol-gel in such a manner as to introduce a quantity of sol-gel representing a mean fraction by weight of 44% in the impregnated preforms after drying.

Each impregnated and dried preform was subsequently subjected to the following heat treatment under nitrogen:
rise at 10° C. per minute (° C./min) up to 600° C.;
pause for 1 h 30 min at 600° C.;
rise at 2° C./min up to 1550° C.; and
pause for 3 h at 1550° C.

The purpose of the pause at 600° C. at low pressure was to eliminate the oxidizing gas that results from degrading organic compounds.

A vacuum of $2.5 \times 10^{-2}$ (mbar) needed to be achieved in the oven prior to launching the heat treatment cycle under a stream of nitrogen (flow rate 4 liters per minute (L/min)). The pressure of the nitrogen was regulated and followed the following cycle:
pause for 1 h at 95 kPa;
drop to 5 kPa in 15 min;
pause for 1 h at 5 kPa;
rise to 95 kPa in 15 min; and
pause for 10 h 55 min at 95 kPa.

After heat treatment, each preform was densified with a PyC matrix obtained by CVI in the same manner as in Example 1.

The final relative density of the composite material was 1.83.

Disks based on the resulting C/C composite material contained a fraction by weight of 4.5% of grains formed of crystallites having a mean size of 40 nanometers (nm) and the crystallites had a $ZrO_xC_y$ composition (83% near monoclinic $ZrO_2$ and 17% quadratic $ZrO_2$, the percentages given for the different phases being percentages by weight, the same applying to the examples below). The term "near monoclinic $ZrO_2$" is used herein to indicate that the possible presence of carbon in the zirconia cannot be totally excluded.

Example 3

Carbon fiber preforms are obtained as in Example 1. Each preform was partially densified with a PyC matrix obtained by CVI so as to obtain a blank having a relative density of 1.3.

The blank was impregnated with a sol-gel solution as obtained in Example 2.

Impregnation was performed by repeating the same cycle twice, comprising vacuum impregnation and drying as in Example 2.

Each impregnated and dried blank was heat treated as in Example 2 and then densified with a PyC matrix obtained by CVI until a final relative density of 1.82 was obtained for the disk.

In the end, each disk obtained contained 4.35% by weight of grains made up of crystallites having a mean size of 20 to 60 nanometers, and the crystallites had the $ZrO_xC_y$ composition (27% cubic $ZrO_{0.7}C_y$ with $0 \leq y \leq 0.3$, 58% monoclinic $ZrO_2$, and 15% quadratic $ZrO_2$).

Example 4

The procedure was the same as in Example 3 except for the heat treatment of each impregnated and dried blank, which was performed as follows.

Temperature: rise at 10° C./min up to 600° C., pause for 90 min at 600° C., subsequent rise at 2° C./min up to 1000° C., and pause for 4 h at 1000° C.

Nitrogen pressure: pause for 1 h at 95 kPa, descend to 5 kPa in 15 min and pause for 1 h at 5 kPa, rise to 95 kPa in 15 min, then pause for 7 h 20 min at 95 kPa.

The final relative density of the resulting disks was 1.81.

Each final resulting disk contained 1.34% by weight of crystallites having a mean size of 10 to 30 nanometers, and the crystallites had a $ZrO_xC_y$ composition (50% near monoclinic $ZrO_2$, and 50% quadratic $ZrO_2$).

It was found that the crystallites were not clumped, but rather they were dispersed in a carbon matrix derived from the saccharose.

Example 5

The procedure was the same as in Example 3 except for the heat treatment, which was performed under argon.

Each final resulting disk contained 6.31% by weight of grains formed of crystallites having a mean size of 15 nanometers, and the crystallites had a $ZrO_xC_y$ composition (42% near monoclinic $ZrO_2$, and 58% quadratic $ZrO_2$).

Test 1

The disks of Examples 1 to 5 were evaluated tribologically by simulating braking. Compared with the usual dimensions for airplane brake disks, the disks used were on a reduced scale having an outside diameter of 144 millimeters (mm), an inside diameter of 98 mm, and a thickness of 14 mm.

Energy densities per unit weight rising from 16 kilojoules per kilograms (kJ/kg) to 500 kJ/kg were applied while imposing initial speeds lying in the range 521 revolutions per minute (rpm) to 2840 rpm and a braking pressure of 3.2 bars.

Figure 5:
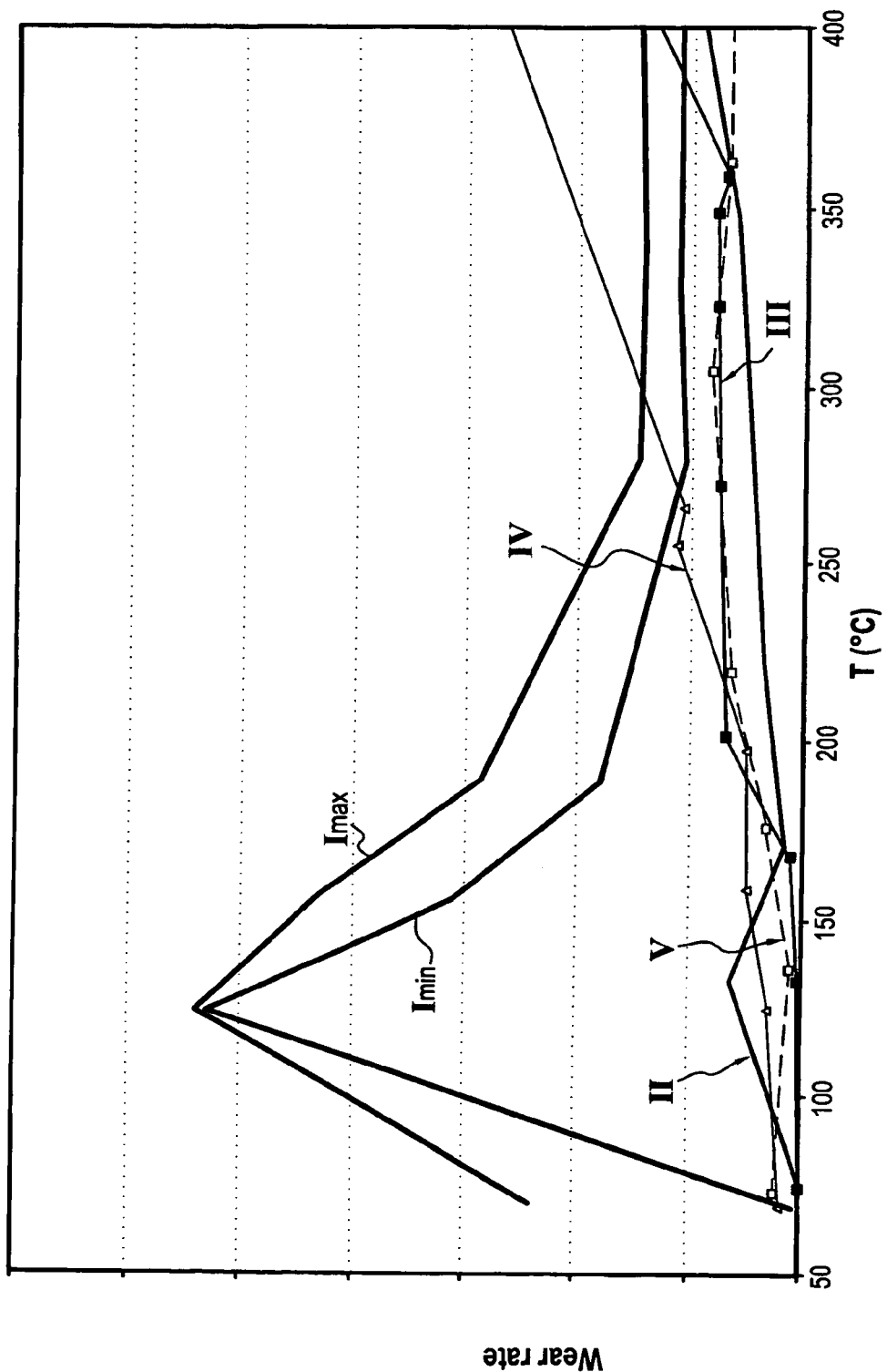
FIG. 5 plots curves representing wear variation measured as a function of temperature for several implementations of friction parts of the invention and not of the invention

The curves of FIG. 5 show the wear rate (reduction of thickness as a function of time) per friction face as a function of the temperature measured by a probe at 1 mm beneath the friction face.

The curves $I_{min}$ and $I_{max}$ represent the envelope of the results obtained using disks in accordance with comparative Example 1.

Curve II represents the results obtained with disks according to Example 2. The presence of $ZrO_xC_y$ grains with a content of 4.5% by weight in the C/C composite material gave rise to a significant reduction in wear over the entire range of stresses investigated, when compared with Example 1.

Curve III represents the results obtained with disks of Example 3 and it confirms that impregnation may be performed after a first partial densification cycle rather than at the fiber preform stage, without significantly affecting the results.

Curve IV represents the results obtained with disks of Example 4 and shows that the conditions of heat treatment after impregnation can be varied, e.g. in order to comply with production requirements, without significantly affecting the results. Furthermore, the results are not significantly affected by the fact that the nanometric crystallites are dispersed within the carbon derived from the saccharose.

Curve V represents the results obtained with disks of Example 5 and shows that using an argon atmosphere instead of a nitrogen atmosphere for the heat treatment does not affect the results.

Test 2

The disks of Examples 1 and 2 were evaluated over the same range of stresses as used in Test 1 while simulating a sequence of 24 "airplane cycles". An "airplane cycle" here comprises five cold braking operations (before takeoff), one service landing braking operation, and five hot braking operations (after landing).

The table below gives the relative values of the wear measured per friction face and per "airplane cycle" for a set of disks according to Example 1 as compared with the wear z measured for one disk of Example 2.

|  | Disks of Example 1 | Disk of Example 2 |
| --- | --- | --- |
| Wear per face and per cycle | 6.45 z to 10 z | z |

The disk of Example 2 showed a decrease in wear of better than 80% compared with the mean for the disks of Example 1.

Test 3

Test pieces based on C/C composite material as obtained in accordance with Examples 1 to 5 were evaluated when subjected to traction stress. The test pieces were in the form of bars presenting dimensions of 130 mm×10 mm×8 mm, with the fibers of the fiber texture being oriented at 0°, +60°, and −60° C. relative to the longitudinal direction of the bars, i.e. the direction in which traction was exerted. The variation in stress as a function of deformation as observed during the traction tests gave rise to damage that was more uniform in the materials of Examples 2 to 5 made in accordance with the invention, as compared with the material of comparative Example 1. The materials of the invention also presented significant improvement in elongation at rupture, with the bars obtained under the conditions of Example 5 presenting an improvement of 20% relative to those of Example 1.

These results show the advantage of the invention for parts based on C/C composite material that are not necessarily for use as friction parts.

What is claimed is:

1. A method of fabricating a part based on carbon/carbon composite material, the method comprising:
   making a preform of carbon fibers by superposing plies of fiber texture and bonding the plies together,
   densifying the preform with a carbon matrix, and
   during the fabrication process, introducing grains or particles of ceramic dispersed within the part,
   wherein, after making the fiber preform and prior to completing densification with said carbon matrix, impregnation is performed using a liquid formed of a sol-gel solution and/or a colloidal suspension enabling one or more zirconium compounds to be dispersed, and the impregnation and the subsequent treatments including completion of the carbon matrix, until the final part is obtained, are performed in such a manner as to have, in the final part, grains or crystallites of one or more zirconium compounds representing a percentage by weight lying in the range 1% to 10% and having at least in majority a composition of the $ZrO_xC_y$ type with $1 \leq x \leq 2$ and $0 \leq y \leq 1$,
   wherein the grains or particles are distributed throughout a volume of the part.

2. A method according to claim 1, wherein the impregnation is performed at least in part with the sol-gel solution containing one or more precursors of the Zr—O—C system.

3. A method according to claim 2, wherein grains of zirconium compounds are formed that are constituted by crystallites of mean size less than 200 nanometers.

4. A method according to claim 2, wherein the impregnation is performed with the sol-gel solution containing at least one zirconia-precursor zirconium compound.

5. A method according to claim 2, wherein the impregnation is performed by with the sol-gel solution containing one or more precursors of carbon.

6. A method according to claim 5, wherein the impregnation is performed with the sol-gel solution containing saccharose.

7. A method according to claim 3, wherein after impregnation, heat treatment is performed to decompose the precursor(s) and to stabilize the zirconium compound(s) in a crystallized form.

8. A method according to claim 7, wherein the heat treatment is performed at a temperature rising to the range 600° C. to 1700° C.

9. A method according to claim 8, wherein the heat treatment is performed at a temperature rising to the range 900° C. to 1550° C.

10. A method according to claim 1, wherein the impregnation is performed with a colloidal suspension containing particles of one or more zirconium compounds.

11. A method according to claim 10, wherein the impregnation is performed at least in part with a colloidal suspension of zirconia particles.

12. A method according to claim 10, wherein the particles have a mean size of less than 200 nanometers.

13. A method according to claim 1, wherein the densification is performed in a plurality of consecutive cycles, and wherein the impregnation is performed at least in part between two cycles.

* * * * *